United States Patent
Boutsicaris

[15] 3,668,185
[45] June 6, 1972

[54] PROCESS FOR PREPARING THERMOPLASTIC POLYURETHANE ELASTOMERS

[72] Inventor: Stephen P. Boutsicaris, Akron, Ohio

[73] Assignee: The Firestone Tire & Rubber Company, Akron, Ohio

[22] Filed: Jan. 8, 1971

[21] Appl. No.: 105,084

Related U.S. Application Data

[63] Continuation of Ser. No. 823,178, May 8, 1969, abandoned, which is a continuation-in-part of Ser. No. 683,803, Nov. 17, 1967, abandoned.

[52] U.S. Cl. ................................260/75 NH, 260/77.5 SP
[51] Int. Cl. ........................................................C08g 22/16
[58] Field of Search ............260/77.5 AN, 77.5 AM, 75 NH, 260/75 NM

[56] References Cited

UNITED STATES PATENTS 2,929,800   3/1960   Hill ........................................260/77.5
3,248,373   4/1966   Barringer ..............................260/77.5
3,475,377   10/1969  Rosendahl et al. ......................260/75

Primary Examiner—Donald E. Czaja
Assistant Examiner—H. S. Cockeram

[57] ABSTRACT

This disclosure relates to a process for the preparation of thermoplastic urethane polymers or elastomers also having urethane and urea linkages derived by the reaction of the adduct of 6-caprolactam and an alkylene diamine, this adduct having the formula $NH_2(CH_2)_5CONH(CH_2)_xNH_2$ in which $x$ has a value of 2–8, with a urethane prepolymer. The resulting urethane-urea elastomer has improved properties in comparison with such elastomers prepared from urethane prepolymers and 4,4'-methylene-bis-2-chloroaniline, generally referred to as "MOCA", or lauroguanamine which are the commonly used diamines for such purpose. In addition to the improved properties compared to the elastomers prepared from MOCA and aliphatic diamines, the product of this process has a considerably longer pot life and the reaction can be carried out at relatively elevated temperatures without gel formation. These elastomers are suitable for preparing melt-spun spandex fibers of high tenacity and melting temperature.

8 Claims, No Drawings

PROCESS FOR PREPARING THERMOPLASTIC POLYURETHANE ELASTOMERS

This application is a continuation of application Ser. No. 823,178, filed May 8, 1969, now abandoned, which in turn is a continuation-in-part of application Ser. No. 683,803, filed Nov. 17, 1967, now abandoned.

FIELD OF THE INVENTION

The present invention relates to the preparation of polyurethane elastomers by the reaction of urethane prepolymers with the adduct of 6-caprolactam and an alkylene diamine.

DESCRIPTION OF THE RELATED PRIOR ART

In the reaction of urethane prepolymers with diamines, most aliphatic and aromatic diamines are much too reactive and result in a relatively short pot life. Moreover this excessive reactivity results in crosslinking of the polymers, thereby favoring thermosetting instead of thermoplastic properties in the products. For fiber forming and injection molding purposes it is necessary to have thermoplasticity in the polymers. Reasonably long pot life and thermoplasticity are obtained with such reactive diamines only when the reaction is carried out in the presence of a large excess of solvent. This is an obvious disadvantage. Only certain diamines, such as "MOCA" and lauroguanamine, give reasonable pot life and thermoplasticity without the necessity of excessive amounts of solvent.

Thoma et al. U.S. Pat. No. 3,305,533 shows for use as chain extenders a group of compounds of which the closest species has the formula $$NH_2(CH_2)_5-CO-NH-NH_2$$

This is a semi-carbazide which has a very reactive group and consequently neither the pot life at room temperature nor the storability at room temperature is anywhere near as good as desired.

In addition to being much more expensive than applicant's chain extender, the semi-carbazide used by Thoma is very reactive and therefore inherently has much shorter pot life and storability. These are evident from the fact that the patentee slows the reaction down by the addition of a stopping agent namely hydrazomonocarboxylic acid ethyl ester (Ex. 1) to improve the pot life and storability, which addition has greater expense and added processing steps as disadvantages.

Peters U.S. Pat. No. 3,180,853 shows the use of a group of compounds having the formula $$NH_2-R-\underset{\underset{R}{|}}{N}-R-NH_2$$

wherein R is $C_1$ to $C_4$ saturated aliphatic group. This is in effect an aliphatic diamine which is very reactive and has very short pot life.

Moreover the presence of the amino group in the middle of the chain extender gives less stability and greater susceptibility to discoloration and degradation as compared to the amide linkage present in applicant's compounds.

Rio et al. U.S. Pat. No. 3,249,577 discloses chain extenders having a diamino-oxamide of the formula $$NH_2-R-NH-CO-CO-NH-R-NH_2$$

The oxamide or —CO—CO— structure in the middle of this chain extender compound is much less stable than an amide linkage. Moreover the great reactivity of the dioxamides and therefore short pot life and poor storability is evidenced by the fact that patentees find it necessary to react the dioxamide at 0° C. (see EX. I.)

SUMMARY OF THE INVENTION

In accordance with the present invention, it has been found that urethane prepolymers can be used to give improved pot life and thermoplasticity by reaction with the adduct of 6-caprolactam and an alkylene diamine having two–eight carbon atoms, the adduct having the structure:

$$H_2NCH_2CH_2CH_2CH_2CH_2\underset{\underset{O}{\|}}{C}NH(CH_2)_xNH_2 \quad \text{(Formula A)}$$

wherein $x$ has a value of 2 to 8. The prepolymer is one advantageously having a molecular weight in the range of 1,000 to 5,000. These prepolymers have terminal isocyanate groups which are capable of reacting with diamines to build up the polymer chain. The resultant polymer chain is, therefore, actually a copolymer having urethane linkages, i.e. —NHCOO—, and urea linkages, —NHCONH—.

The caprolactam-alkylene diamine adduct can be prepared by the procedure described in U.S. Pat. No. 2,756,257. Accordingly the two reagents are heated in equimolar quantity in the presence of a catalytic amount of phosphorus acid at a temperature of about 190° C. to 300° C. The product is recovered by removing unreacted materials and byproducts by heating at 100° C. under a reduced pressure of 2 mm Hg for 1 hour. The residue solidifies to a waxy mass upon allowing to come to room temperature.

Typical alkylene diamines that can be used in preparing the adduct are ethylene diamine, 1,3-propylene diamine, 1,4-butylene diamine, or tetramethylene diamine, pentamethylene diamine, hexamethylene diamine, heptamethylene diamine and octamethylene diamine.

The liquid prepolymer used in the practice of this invention is prepared by the reaction of a diisocyanate with a polymeric diol and can be represented by the formula $$ONC\left[-Z-NH-\underset{\underset{O}{\|}}{C}-O-R-O-\underset{\underset{O}{\|}}{C}-NH-Z-NH-\underset{\underset{O}{\|}}{C}-O-R-O-\underset{\underset{O}{\|}}{C}-NH-\right]_n Z-NCO \quad \text{(Formula B)}$$

wherein R is a divalent aliphatic polyether or polyester radical as described below, Z is a divalent hydrocarbon radical such as arylene, alkylene or cycloalkylene, and n has a value of at least 1 and preferably no more than 3.

The preparation of the prepolymer can also be illustrated in the progressive stages as follows $$OCN-Z-NCO + R(OH)_2 \longrightarrow$$
(1 mole) (2 moles)

$$HO-R-O-\underset{\underset{O}{\|}}{C}-NH-Z-NH-\underset{\underset{O}{\|}}{C}-O-R-OH$$

$$\downarrow OCN-Z-NCO \text{ (2 moles)}$$

$$ONC\left[-Z-NH-\underset{\underset{O}{\|}}{C}-O-R-O-\underset{\underset{O}{\|}}{C}-NH-Z-NH-\underset{\underset{O}{\|}}{C}-O-R-O-\underset{\underset{O}{\|}}{C}-NH-\right]Z-NCO$$

Generally by using a polymeric diol of sufficient molecular weight the desired prepolymer is obtained at this stage where $n$ has a value of 1.

However if a relatively low molecular weight diol such as diethylene glycol, triethylene glycol, etc., is used the prepolymer can be taken to a further stage by increasing the proportion of diol and continuing the reaction so that $n$ has a higher value. Generally for prepolymer uses the value of $n$ does not exceed 3.

Typical diisocyanates that can be used in preparing the liquid prepolymers used in this invention include: 2,4-toluene diisocyanate, 2,6-toluene diisocyanate, p-phenylene diisocyanate, 4,4'-diphenylmethane diisocyanate, 1,5-naphthylene diisocyanate, dibenzidene diisocyanate, benzidene diisocyanate, 4,4'-diphenyl diisocyanate, 4,4'-diphenylmethane diisocyanate (MDI), 2,2'-xylylene diisocyanate, hexamethylene diisocyanate, tetramethylene diisocyanate, cyclohexylene diisocyanate, 4,4'-dicyclohexylmethane diisocyanate, etc. Toluene diisocyanate is preferred.

When the prepolymer (Formula B) is reacted with the adduct shown in Formula A, the polymer product can be represented as:

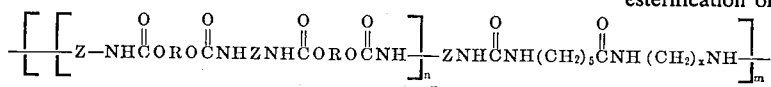

If the residue or moiety of the adduct between the two terminal amino groups is represented by R', this polymer product can also be represented as:

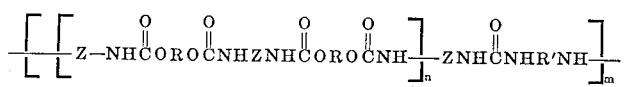

Thus R' represents the moiety

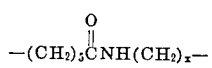

The integer represented by m has a value of at least one, and preferably at least two, with the upper limit bounded by the properties desired. Generally, however, there is no particular need to have a value of m over 100.

In these polymers the urea segment, namely

can represent from 1 to 50 percent by weight of the polymer depending on the relative amounts used as well as the relative molecular weight of the prepolymer as compared to the adduct. The final polymer has a molecular weight of at least 1,200 and preferably at least 3,000.

While the scope of this invention is intended broadly to cover the polymers formed by the reaction of the above-described adduct with various types of polyurethane prepolymers, the invention is particularly suitable for the preparation of elastomers derived by the reaction of the adduct with such prepolymers to form polymers in which the urea segments of the polymer represent about 10–40 percent by weight of the polymer. In calculating the percentage of urea segments which favor the elastomeric characteristics, the desired 10–40 percent by weight of urea segments is based on the formula

The dihydric materials can have as the divalent R radicals either polyalkylene ether radicals or polyester radicals. For example, polyesters can be used as prepared by esterification of a dicarboxylic acid or its anhydride and a glycol, for example, from maleic anhydride and ethylene glycol, succinic anhydride and propylene glycol, phthalic anhydride and ethylene glycol, adipic acid and ethylene glycol, etc., polymeric diols derived from omega-hydroxyacids, such as those having the formula

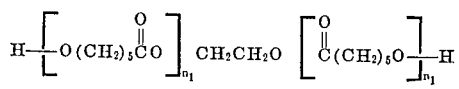

as generated by the polymerization of epsilon-caprolactam initiated by ethylene glycol.

Polyalkylene ethers having terminal hydroxyl groups can be used to provide the R group such as the polyethers prepared by the condensation of an alkylene oxide, e.g. ethylene oxide, propylene oxide, etc. A particularly useful polyalkylene ether is polytetramethylene glycol which has the formula $HO[-(CH_2)_4O-]_xH$ where $x$ has a value of 2–60. Polyalkylene ethers which can be used include: polyethylene glycols and the corresponding polymers of 1,3-butylene glycol, hexamethylene glycol, pentamethylene glycol, 1,2-propylene glycol, trimethylene glycol, hydroquinone-beta-diethylolether, quinitol, 4,4'-dihydroxydicyclohexyl-dimethylmethane, 4,4'-dihydroxydicyclohexylmethane, etc.

Typical polyesters are disclosed in U.S. Pat. Nos. 2,620,516 and 2,729,618. Thus, polyesters formed by conventional esterification of dihydric alcohols and dibasic organic acids

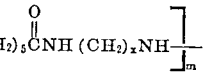

can be used as the organic compound having the terminal hydroxyl groups. The alcohol component should be used in such amount as to produce a final product having an hydroxyl number within the range of from about 20 to about 100. Suitable dicarboxylic acids include adipic acid, succinic acid, glutaric acid, phthalic acid, and the like, preferably in the anhydride form. The dihydric alcohol may be ethylene glycol or other suitable glycol. Other polyester diols applicable in the practice of this invention are those derived form polymerization of a lactone, such as caprolactone.

One method for conducting the esterification comprises heating the reagents to a temperature of about 110°–120° C. until the water formed during the esterification is removed by distillation and then raising the temperature to about 210°–220° C. under reduced pressure until the esterification is completed. The resulting polyester with terminal hydroxyl groups is dehydrated by maintaining a temperature of about 110°–150° C. under less than atmospheric pressure or while covered with an inert gas, such as nitrogen, until all of the moisture has been removed. Hydroxy polyesters are prepared by thermal esterification using a molecular excess of glycol, for example, 12 moles of ethylene glycol and 11 moles of adipic acid, etc. The molecular weight of the polyester is increased or decreased by increasing or decreasing the molar excess of glycol.

Where a liquid prepolymer is desired, it is necessary to use sufficiently low molecular weight materials such as the polyhydric compounds and the diisocyanates and to control the number of such compounds reacted per polymer molecule to give a sufficiently low molecular weight that the prepolymer will be liquid.

DESCRIPTION OF SPECIFIC EMBODIMENTS

The invention is best illustrated by the following examples. These examples are given merely for purpose of illustration and are not intended to limit in any way the scope of the invention or the manner in which it may be practiced. Except where specifically indicated otherwise, parts and percentages are given by weight.

EXAMPLE I

Preparation of Adduct

Equal molar amounts of epsilon-caprolactam and hexamethylene diamine are added, together with 0.3 percent by weight of phosphorus acid, to a reactor bottle and the bottle is sealed. Then the bottle is maintained at a temperature of 198° C. for 65 hours. After cooling and opening the bottle, the volatile components are removed by distilling at 100° C. under a reduced pressure of 2 mm Hg for 1 hour. The residue upon standing at 25° C. solidifies to a white, waxy solid. This is the adduct used in subsequent examples.

EXAMPLE II

Reaction of Prepolymer with Adduct

A prepolymer masterbatch is prepared by stirring together 128 g. (0.1065 moles) of a dihydroxy butylene adipate polyester (Mol. Wt. of 1200) and 56.2 g. (0.2245 moles) of MDI (p,p'-methylene diphenylisocyanate) for 50 minutes at 135° C. Several tests are then carried out using this prepolymer and the adduct prepared in Example I. Thus 16.7 g. (0.073 moles) of the adduct dissolved in 100 ml. of DMF is added to a flask containing 114 g. (0.073 moles NCO) of the above prepolymer dissolved in 500 ml. of DMF. The adduct is added at 50° C. in two portions at 3 minute intervals. The solution is then stirred at about 50° C. for a total of 60 minutes without external application of heat. At the end of this time, the viscous solution is poured into water and the resulting solids are removed and washed on the wash mill, cleaned, air dried overnight, then milled again on the hot mill (140° F.), and finally dried in vacuo for 5 hours and tested. The elastomer shows a tensile strength of 6160 psi and an elongation of 568 percent. Melt extrusion at 170°–175° C. yields elastic monofilaments with a tenacity of 0.71 g/denier, 100 percent modulus of 0.116 g/denier, elongation of 620 percent and permanent set 66 percent. In another test reaction of the caprolactam-HMDA adduct with the prepolymer was carried out at 70°–80° C. for 30 minutes. Under these conditions the solution showed no gelation but the product is very tough.

EXAMPLE III

The procedure of Example I is repeated using in place of the hexamethylene diamine an equivalent amount respectively of ethylene diamine, tetramethylene diamine, pentamethylene diamine and octamethylene diamine. The respective products are each reacted in equivalent amount with the polyester diisocyanate prepolymer produced in Example II. In each case improved results are obtained in the pot life and the products are suitable for preparing melt-spun spandex fibers of high tenacity and melting temperature.

EXAMPLE IV

The procedure of Example II is repeated using, in place of the polyester prepolymer, a polyether prepolymer prepared as follows: 1,400 parts of a polytetramethylene glycol having a molecular weight of about 1,000 and 150 parts of toluene diisocyanate are reacted to give a prepolymer having a molecular weight of about 1,300 and a free isocyanate content of about 6.8 percent. The resultant elastomer has similar improved properties in pot life and is melt-spun to give spandex fibers of high tenacity and melting temperature.

EXAMPLE V

The procedure of Example II is repeated using in place of the diisocyanate of that example equivalent weights respectively of the following diisocyanates: p,p'-diphenyl diisocyanate, p-phenylene diisocyanate, 1,5-naphthylene diisocyanate, dibenzidene diisocyanate, hexamethylene diisocyanate, tetramethylene diisocyanate, 4-cyclohexylene diisocyanate and 4,4'-dicyclohexylmethane diisocyanate. In each case similar improved results are noted.

EXAMPLE VI

The procedure of Example IV is repeated using respectively in place of the polyether diol of that example equivalent amounts respectively of prepolymers prepared from polyether diols having approximately the same molecular weight as that of Example IV: polyethylene glycol, polypropylene glycol, polyoctylene glycol. Similar improved results are obtained.

EXAMPLE VII

The procedure of Example II is repeated a number of times using respectively an equivalent amount of a prepolymer formed by substituting in place of the butylene adipate polyester a polyester of approximately equivalent molecular weight derived by substitution of the anhydrides of succinic acid, glutaric acid and phthalic acid respectively in place of the adipic acid used in making the polyester portion of the prepolymer. Similar improvements are noted in the products.

EXAMPLE VIII

The procedure of Example II is repeated a number of times using in place of dihydroxy butylene adipate an equivalent amount of a dihydroxy polyester in which the tetramethylene glycol has been replaced respectively by an equivalent amount of hexamethylene glycol, pentamethylene glycol, trimethylene glycol, ethylene glycol, hydroquinone-beta-diethylol ether, 4,4'-dihydroxy dicyclohexylmethane. Similar improvements are noted in the ultimate product. Similar results are obtained when equivalent amounts of mixtures of these are used.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

THE INVENTION CLAIMED IS:

1. A polymerizable composition having improved shelf life, and suitable for preparing an improved thermoplastic polyurethane polymer, consisting essentially of the reaction product of a polyurethane prepolymer having a molecular weight of at least 1,000 and having the formula

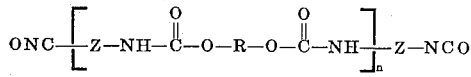

wherein:
Z is a divalent arylene hydrocarbon radical;
R is a divalent aliphatic polyester radical; and
n is an integer having a value of at least 1; and at least 1 percent by weight of an adduct of epsilon-caprolactam and an alkylene diamine, said adduct having the formula

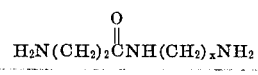

wherein x is an integer having a value of 2–8.

2. The composition of claim 1 in which the n of said formula has a value of 1.

3. The composition of claim 1 in which said prepolymer has a molecular weight in the range of 1,000–5,000.

4. The composition of claim 1 in which the alkylene diamine used in forming said adduct is hexamethylene diamine.

5. The composition of claim 1 in which said R radical in said prepolymer formula represents the residue of polytetramethylene adipate diol.

6. The composition of claim 1 in which said R radical in said prepolymer formula represents the residue of polyethylene-butylene adipate diol.

7. The composition of claim 1 in which R represents the residue of a polybutylene adipate diol.

8. The composition of claim 1 in which said Z of said prepolymer formula represents a diphenylene methane radical.

* * * * *